United States Patent [19]

Maeda et al.

[11] 4,265,164
[45] May 5, 1981

[54] PRESSURE DETECTING DEVICE

[75] Inventors: Eizo Maeda, Tokyo; Hiromichi Iizuka, Yokosuka, both of Japan

[73] Assignee: Kabushiki Kaisha ASAHI Enterprise, Kanda, Japan

[21] Appl. No.: 32,458

[22] Filed: Apr. 23, 1979

[30] Foreign Application Priority Data

Apr. 24, 1978 [JP] Japan ................................. 53/48468
Jan. 16, 1979 [JP] Japan ............................. 54/3609[U]

[51] Int. Cl.³ ............................................ F15B 15/17
[52] U.S. Cl. ..................................... 91/417 R; 91/321
[58] Field of Search ..................... 91/417 R, 235, 321, 91/342, 300, 455

[56] References Cited

U.S. PATENT DOCUMENTS

| 1,511,425 | 10/1924 | Roucka | 91/417 R X |
|---|---|---|---|
| 3,079,900 | 3/1963 | Hunnicutt | 91/321 X |
| 3,598,020 | 8/1971 | Blok | 91/417 R |
| 3,691,907 | 9/1972 | Paschke | 91/342 |

*Primary Examiner*—Edward J. McCarthy
*Attorney, Agent, or Firm*—Charles R. Hoffmann

[57] ABSTRACT

A pressure detecting device for detecting air pressure by means of a pressure receiving member which is energized by a coil spring, wherein a seal is provided between the side wall of the detector housing at the pressure detecting port side and the pressure receiving member as well as between the other side wall of the housing at the discharge port side and the pressure receiving member and further sealing area at the discharge port side is larger than that at the pressure detecting port side.

As a preferred application of the pressure detecting device a control system for a press machine is constructed such that operation and stop of the press machine are controlled by way of controlling supply and discharge of pressurized air to and from the press machine with the aid of a double valve and the pressure detecting device.

As another preferred application of the pressure detecting device a stroke ends detecting system for a pneumatic cylinder is constructed such that both pressure chambers in the pneumatic cylinder divided by the piston are communicated with the pressure detecting ports of the pressure detecting devices.

11 Claims, 17 Drawing Figures

PRESSURE DETECTING DEVICE

BACKGROUND OF THE INVENTION

The present invention relates to a pressure detecting device for detecting air pressure, which is preferably incorporated in a control system for a press machine and a stroke ends detecting system for a pneumatic cylinder or the like.

As well known, a pressure receiving member in the pressure detecting device employed for a pneumatic-electric signal converter or the like is constructed by a piston or plunger in the high pressure area or by a diaphragm in the low pressure area or by a Buldon tube for the both high and low pressure areas.

Figure 1:
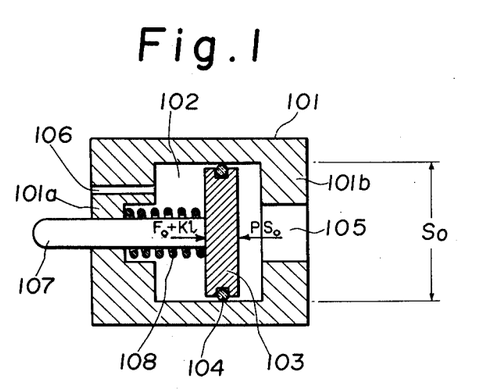
FIG. 1 is a schematic sectional view of typical one of the conventional pressure detecting devices.

The conventional pressure detecting device with a piston incorporated therein is typically shown in FIG. 1. The detector housing 10 is formed with an axial bore 102 in which a piston 103 that is a pressure receiving member is axially displaceably inserted. On the outer surface of the piston 103 is arranged an annular seal 104 by means of which the pressure detecting port 105 and the discharge port 106 are air-tightly separated from each other. An actuating rod 107 is secured to the piston 103, which is displaceably extended outward through the side wall 101a at the discharge port side of the detector housing. Said actuating rod 107 is intended, for instance, for shifting a limit switch to ON position or OFF position by way of forward and backward movement thereof. Further the piston 103 is energized toward the pressure detecting port 105 by means of a coil spring 108. Now the resilient force of the coil spring 108 is defined as F. As pressurized air flows through the pressure detecting port 105 into the pressure chamber of the housing, the piston 103 is subjected to the leftward force $PS_o$, as shown in FIG. 1, where P is air pressure and $S_o$ is area of the piston 103. Assuming that $F_o$ is resilient force of the coil spring 108, when the piston 103 comes in close contact with the side wall 101b of the housing, the following equation is applicable, as air pressure P reaches the predetermined pressure $P_o$.

$$F_o = P_o S_o \quad (1)$$

As air pressure P is further increased, the piston 103 starts to be displaced against the resilient force $F_o$ of the coil spring 108 in the leftward direction in FIG. 1. When the piston 103 is displaced by distance l, the resilient force F of the coil spring 108 is defined by the following equation, $$F = F_o + Kl \quad (2)$$

where K is spring coefficient. Since this resilient force F is equal to force caused by input air pressure, the following equation is applicable.

$$F = P S_o \quad (3)$$

Then, when putting Equations (1) and (2) into Equation (3), the following equation is obtained.

$$P = P_o + \frac{K}{S_o} \times l \quad (4)$$

Figure 2:
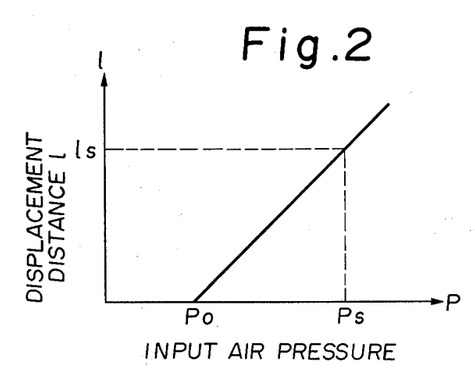
FIG. 2 is a diagram which illustrates operating characteristics of the pressure detecting device in FIG. 1.

This equation can be represented by FIG. 2. Hence the operating characteristics of the pressure detecting device is such that as input air pressure P is increased, displacement distance l is linearly increased, as illustrated in FIG. 2. As input air pressure P reaches the predetermined pressure $P_s$, the actuating rod 107 is displaced by distance $l_s$. At this moment the limit switch (not shown) is shifted to ON position or OFF position so that the required pressure detecting is performed.

Since there is existent a linear relation between displacement distance l and input air pressure P with the conventional pressure detecting device, as illustrated in FIG. 2, the following disadvantages are pointed out with it.

Firstly, the pressure detecting device has a short durability of life particularly due to wearing of the seal, because the actuating rod is vibratively displaced forward and backward with the seal ring which is always in contact with the wall face, as air pressure fluctuates. If, however, the pressure detecting device is made less sensitive against pressure fluctuation, response accuracy is reduced.

Secondly, it is difficult to detect two pressures with high pressure ratio therebetween, because high pressure ratio requires long displacement distance and the conventional presure detecting device fails to meet this requirement due to the inherent structure thereof.

Moreover the seal member 104 which serves for providing air tightness between the pressure detecting port 105 and the discharge port 106 brings about the following disadvantages. Firstly, the piston 103 is irregularly displaced due to frictional force which is effective between the seal 104 and the inner wall face of the detector housing 101, causing the piston 103 to be stopped sometime. As a result response accuracy is reduced. Further the frictional force makes it impossible to carry out pressure detecting at the lower pressure area. Furthermore the pressure detecting device cannot be used for frequent operation, because the seal 104 wears off due to sliding contact against the inner wall face of the housing, as the piston 103 is displaced. As a result service life of the pressure detecting device is shortened.

It is to be noted that the drawbacks with the conventional pressure detecting device with a piston incorporated therein as mentioned above are common problems which are applicable to those with a plunger incorporated therein.

In the meantime, the pressure detecting device in which a diaphragm is arranged has also drawbacks that it is employed only at the low operation pressure area and that it has a short durability of life because of repeated deformation of the diaphragm operation. The pressure detecting device with a Buldon tube incorporated therein has also similar drawbacks of reduced response accuracy, short life or the like. These conventional pressure detecting devices in the diaphragm or Buldon tube type have linear characteristic in respect of relation of displacement distance l to input air pressure P, as illustrated in FIG. 2. Thus they cannot be free from the aforesaid drawbacks which are brought about by their structural condition.

SUMMARY OF THE INVENTION

In view of the drawbacks with the hitherto known pressure detecting devices as mentioned above, the present invention has been made.

It is a main object of the present invention to provide a pressure detecting device with an excellent response accuracy.

It is other object of the present invention to provide a pressure detecting device having a high pressure ratio between two pressures to be detected.

It is another object of the present invention to provide a pressure detecting device which carries out pressure detecting in a wide pressure range covering high pressure to low pressure area.

It is further object of the present invention to provide a pressure detecting device with a long durability of service life.

Other objects and advantageous features of the invention will be readily apparent from the following description which is made with reference to the accompanying drawings illustrating preferred embodiments of the invention.

To realize the aforesaid objects there is proposed in accordance with the invention an improved pressure detecting device which comprises a housing having a pressure detecting port at one of the side walls and a discharge port at the other side thereof, a pressure receiving member axially displaceably arranged in an axial bore in said housing, said axial bore being communicated with the pressure detecting port through said one side wall of the housing, an actuating rod secured to said pressure receiving member and displaceably extended through the other side wall of the housing and a coil spring which is energized to displace the pressure receiving member toward the pressure detecting port, wherein a seal is provided between the side wall of the housing at the pressure detecting port side and the pressure receiving member as well as between the other side wall of the housing at the discharge port side and the pressure receiving member and further the sealing area at the discharge port side is larger than that at the pressure detecting port side.

In a preferred embodiment of the invention the pressure receiving member is constructed in the form of disk-like piston poppet to which the actuating rod is secured.

In another preferred embodiment of the invention the pressure receiving member is a ball made of light weight and resilient material.

The housing of the pressure detecting device may be constructed of two case halves which are axially split, said case halves being united each other.

A typical application of the pressure detecting device is seen in a control system for a press machine in which operation and stop thereof are controlled by way of controlling supply and exhaust of pressurized air to and from the press machine with the aid of a double valve and the pressure detecting device.

Another typical application of the pressure detecting device of the invention is a stroke ends detecting system for a pneumatic cylinder in which both pressure chambers in the pneumatic cylinder divided by the piston are communicated with the pressure detecting ports of the pressure detecting devices.

BRIEF DESCRIPTION OF THE ACCOMPANYING DRAWINGS

Now the present invention will be described in detail with reference to the accompanying drawings which illustrate preferred embodiments of the invention, in which:

FIGS. 8(a) to 8(c) are a piping diagram of the first application of the pressure detecting device in accordance with the invention respectively, which is put in use for detecting any trouble with a parallel flow type double valves incorporated in a press machine for controlling the same, wherein

FIGS. 9(a) to 9(d) are a piping diagram of the second application of the pressure detecting device in accordance with the invention respectively, which is put in use for detecting stroke ends of a pneumatic cylinder, wherein

DETAILED DESCRIPTION OF THE PREFERRED EMBODIMENT OF THE INVENTION

Figure 3:
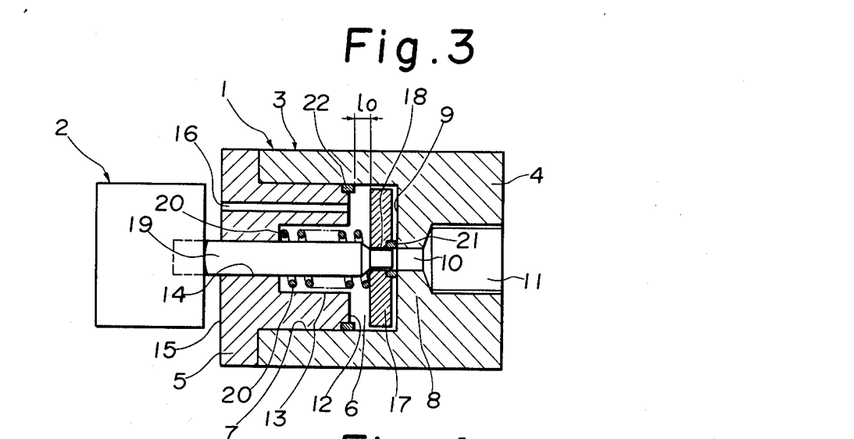
FIG. 3 is a sectional view of a pressure detecting device in accordance with the first embodiment of the present invention, in which the pressure receiving member is located in the rearward position.
Figure 4:
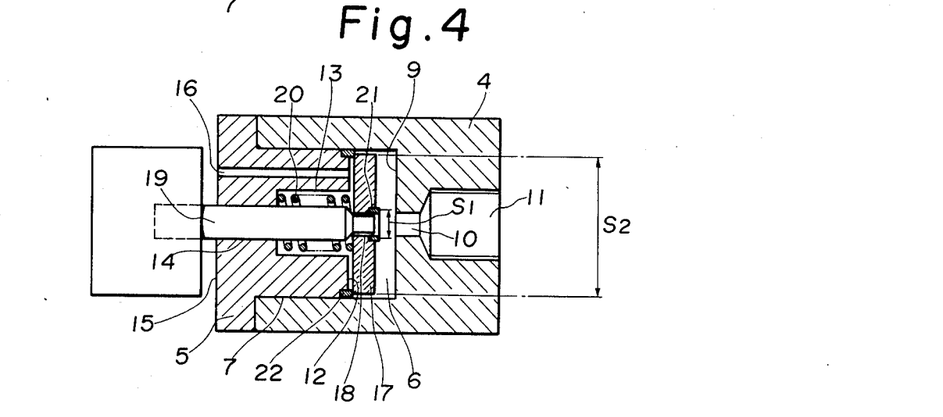
FIG. 4 is another sectional view of the pressure detecting device similar to FIG. 3, in which the pressure receiving member is located in the forward position.

Referring to FIG. 3 and FIG. 4 which illustrate a pneumatic-electric signal converter in accordance with the first embodiment of the invention, the reference numeral 1 denotes a pressure detecting device and the reference numeral 2 denotes a limit switch. The housing of said pressure detecting device 1 is constructed of a case 4 and an end cap 5. In the case 4 is formed an axial bore 6 in the sectional form of a circle, which is opened to the outside at the right end of the case 4 via a detecting port 10. At the open end 7 of the bore 6 is placed an end cap 5 which is air-tightly inserted and secured in said bore 6 with the aid of bolts or the like (not shown).

Further at the middle part 8 of said case 4 is formed a detecting port 10 which is in communication with the bottom face 9 of the bore 6. Said detecting port 10 has an enlarged portion 11 at its inlet, which is threaded on the inner surface thereof so as to make a connection to a pneumatic piping (not shown).

In the meantime, a cylindrical hole 13 is provided in the area extending from the right end 12 to the middle part of the end cap 5 and further a through hole 14 is provided in the area extending from the left end of said cylindrical hole 13 to the other end 15 of the end cap 4. Moreover a discharge hole 16 is extended between the left end face 15 and the right end face 12 of the end cap 5. The depth of the axial bore 6 is dimensioned such that there is left a movable space having the predetermined length $l_o$ in the area between the right end face 12 of the end cap 5 and the bottom face 9 of the bore 6, said movable space having a disk-like piston poppet 17 disposed therein, which serves as a pressure receiving member, having a diameter a little smaller than the inner diameter of the bore 6. In the central part of said piston poppet 17 is formed a threaded hole 18 having the substantially same inner diameter as that of the detecting port, in which an actuating rod 19 is air-tightly screwed at the base end portion thereof. This actuating rod 19 is slidably extended through the guide hole 14 in the end cap 5. Further in the cylindrical hole 13 is arranged a coil spring 20 which is adapted to press against the piston poppet 17 during normal operation to displace it toward the bottom face 9. As apparent from the drawings, the threaded hole 18 is located in exact alignment to the detecting port 10. To ensure air-tightness the first annular seal 21 is arranged about the threaded hole 18 at its right end, while the second annular seal 22 is arranged on the end cap 5 at its right end to come in contact with the inner wall of the axial bore 6. Thus the first seal 21 prevents any flowing through the discharge port 16 from the detecting port 10, as the piston poppet 17 is located in the rearward position as shown in FIG. 3. Hereinafter area $S_1$ defined by the first seal 21 is referred to as a detecting port side seal area. Further the second seal 22 ensures air-tightness between the detecting port 10 and the discharge port 16, as the piston poppet 17 is located in the forward position as shown in FIG. 4. Area $S_2$ to be sealed in the forward position is equal to an area defined by the second seal 22, that is, a surface area of the piston poppet 17. Hereinafter area $S_2$ is referred to as a discharge port side seal area. As seen from the drawings, there is a relation that the discharge port side area is much larger than the detecting port side area, that is, $S_2 > S_1$.

A limit switch 2 is disposed at a distance from the left end face of the end cap 5, which is turned on or off by way of forward or rearward displacement of the actuating rod 19.

Now operating of the pressure detecting device constructed in the above mentioned manner will be described as follows.

First, when the piston poppet 17 is located in the rearward position as shown in FIG. 3, the first seal 21 serves to ensure air-tightness between the both detecting and discharge ports 10 and 16, wherein the pressure receiving area of the piston poppet 17 is equal to the detecting port side seal area $S_1$.

When air pressure P is lower than the specified pressure $P_1$, the following equation is applicable, provided that the resilient force of the coil spring 20 in the rearward position is $F_1$.

$$F > P \times S_1 \qquad (5)$$

Thus the piston poppet 17 is held still in the position as shown in FIG. 3 without any movement thereof. This holding state lasts until the input air pressure reaches $P_1$, as illustrated by step $a' \rightarrow b$ on the abscissa in FIG. 5.

As the air pressure is raised to $P_1$, the following equation is available.

$$F_1 = P_1 S_1 \qquad (6)$$

When the input air pressure P is increased a little bit above the specified pressure $P_1$, the piston poppet 17 is displaced by a short distance against the resilient force $F_1$ of the coil spring 20. As a result the first seal 21 is released from air-tightness, causing the input air pressure P to be exerted on the whole area $S_2$ of the piston poppet 17, whereby the piston poppet 17 is very quickly displaced by distance $l_o$ toward the right end face of the end cap 5 due to a quickly increased force $P \times S_2$ over the former one $P \times S_1$, which acts on the piston poppet 17 in the leftward direction. Due to this displacement of the piston poppets 17 the actuating rod 19 is displaced forward to shift the limit switch 2, whereby the pressure $P_1$ is detected. The operation of the pressure detecting device as mentioned above is illustrated by step $b \rightarrow c$ on the abscissa in FIG. 5. In this connection it is to be noted that as the piston poppet 17 is displaced in that way, the coil spring 20 is compressed, resulting in an increased resilient repulsion force F, but this increase in repulsion force of the coil spring 20 can be neglected because of the facts that displacement distance $l_o$ of the piston poppet 13 is short and that increase in working pressure on the piston poppet is remarkably large due to the high area ratio of $S_1:S_2$ in comparison with increase in resilient repulsion force of the coil spring.

Since the piston poppet 17 comes in contact against the second seal 22 is a very short period of time, a little leakage of input air through the clearance between the periphery of the piston poppet 17 and the inner wall of the axial bore 6 and then through the discharge port 16 has no effect on operation of the piston poppet 17.

Figure 5:
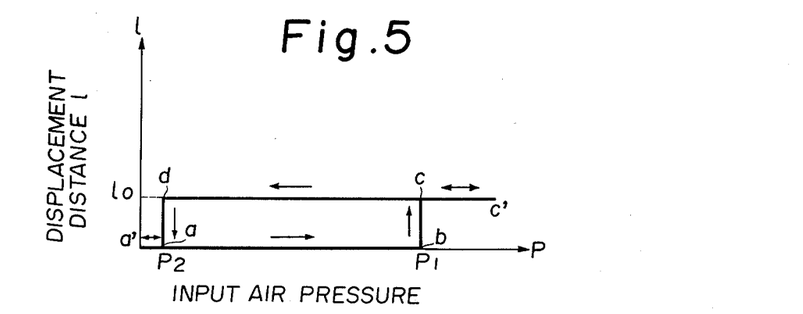
FIG. 5 is a diagram which illustrates operating characteristics of the pressure detecting device as shown in FIGS. 3 and 4.

Then the sealing state with the pressure detecting device as shown in FIG. 4 is maintained until the input air pressure is further raised above $P_1$ and thereafter lowered to $P_2$. Specifically the following equation is applicable with the sealing state in FIG. 4;

$$F_2 < P \, S_2 \qquad (7)$$

where $F_2$ is resilient retaining force of the coil spring 20 in FIG. 4. This means that working force caused by input air pressure overcomes resilient retaining force F of the coil spring 20. This sealing state is illustrated by way of steps of $c \rightarrow c' \rightarrow c \rightarrow d$ in FIG. 5.

Next, as the input air pressure is lowered to $F_2$, the following equation is applicable.

$$F_2 = P_2 S_2 \qquad (8)$$

When the air pressure P is further lowered a little bit below $P_2$, the resilient repulsive force $F_2$ of the coil spring 20 becomes a little larger than the working force of $P_2 S_2$, whereby the piston poppet 17 is released from the second seal 22. Thus the input air pressure is discharged through the discharge port 16, resulting in quickly decreased working force acting on the piston poppet 17 in the leftward direction. Thereby the piston poppet 17 is displaced by distance $l_o$ toward the bottom face 9 of the bore 6 by means of the resilient repulsive force F of the coil spring 20 in a very short period of time, so that the opposite positional state as shown in FIG. 3 is restored in which air flowing between the detecting port 10 and the discharge port 16 is shut off with the aid of the first seal 21. This operation of the pressure detecting device is illustrated by way of step of $d \rightarrow a$ in FIG. 5. This operation causes the actuating rod 19 to be displaced backward and thereby the switch 2 is shifted so that the pressure $P_2$ is detected. This sealing state as illustrated in FIG. 4 is maintained until the input air pressure is further lowered below $P_2$ and thereafter is raised to $P_1$ again. This positional state is illustrated by way of steps a→a'→b in FIG. 5.

As mentioned above, the relation between input air pressure P and distance of displacement is illustrated as a histerisis loop comprising the steps of a'-→a→b→c→c'→c→d→a→a' in FIG. 5.

Hence the relation between input air pressure P and displacement distance $l_1$ with the pressure detecting device in accordance with the present invention is not linear as the case with the conventional device but is such that when reaching the predetermined pressure $P_1$ and $P_2$, the piston poppet 17 is instantaneously displaced by distance l to shift the switch 2 with stability of operation. Moreover as another advantage of the device of the invention a ratio of predetermined pressure $P_1$ to $P_2$ can be much more than that of the conventional device. Specifically, the following equations can be applied on the basis of Equations (6) and (8).

$$P_1 = F_1/S_1 \quad (9)$$

$$P_2 = F_2/S_2 \quad (10)$$

In this connection it is to be added that since ratio of resilient force of coil spring $F_2/F_1$ is small in comparison with a ratio of sealing area $S_1/S_2$, the following equation is applicable.

$$F_1 \div F_2$$

Hence the following equation can be established.

$$\frac{P_2}{P_1} = \frac{S_1}{S_2} \quad (11)$$

This means that the pressure ratio can be changed by changing the area ratio. Since it is easier with the device of the invention to have a large area ratio than to make a stroke longer as is the case with the conventional device (due to a fact that an area is relative to a square of length), a large pressure ratio can be obtained. Further since pressure ratio is controlled by way of area ratio with the pressure detecting device of the invention, substantially irrespective of displacement distance of the piston poppet 17, said displacement distance $l_o$ can be shortened, resulting in improved stability of response. In this connection it is to be added that said detecting pressure $P_1$ and $P_2$ can be controlled also by way of resilient force of the coil spring 20. In this case it should be of course understood that pressure ratio doesn't change by all means.

As mentioned above, air seal between the detecting port 10 and the discharge port 16 is ensured by means of the first seal 21 incorporated into the piston poppet 17 and the second seal 22 secured to the peripheral edge of the end cap 5. The arrangement eliminates necessity of mounting a seal round the periphery of the piston poppet 17 and thus there is no possibility that wearing takes place due to sliding contact of sealing means against the inner wall of the housing of the detecting device during sliding movement of the piston poppet, as is the case with the conventional device. Hence the service life of the pressure detecting device can be extended owing to the arrangement as described above. Moreover, since no frictional force is exerted on the piston poppet 17 during movement thereof, the same can be smoothly displaced with excellent response accuracy. Additionally the device is well responsive even at lower working pressure.

In the above described embodiment of the invention the pressure detecting device 2 is employed for a pneumatic-electric signal converter. It should be understood that the present invention is not limited only to this embodiment but it may be applied to a pneumatic-pneumatic signal converter. In the latter case the actuating rod 19 is constructed so as to shift a mechanical valve (not shown).

Further in the above described embodiment of the invention the first seal 21 is secured onto the piston poppet 17. It should be of course understood that the invention is not limited only to this arrangement but the first seal 21 may be secured to the bottom face 9 of the axial bore 6.

Furthermore in the above described embodiment of the invention the second seal 22 is mounted on the peripheral edge of the end cap 5. It should be understood, however, that the invention is not limited only to the arrangement but the second seal 22 may be secured in place to the end face 12 of the end cap or to the inner wall of the housing 3 of the detecting device or to the opposite end face of the piston poppet 17.

Figure 6:
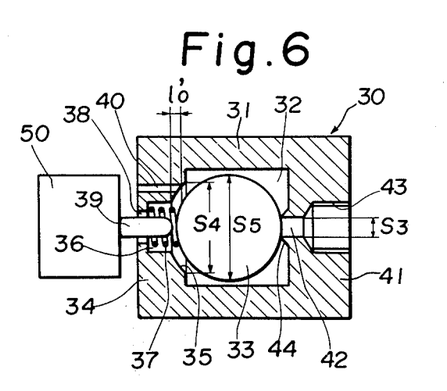
FIG. 6 is a sectional view of a pressure detecting device in accordance with the second embodiment of the present invention, in which the pressure receiving member is located in the rearward position.
Figure 7:
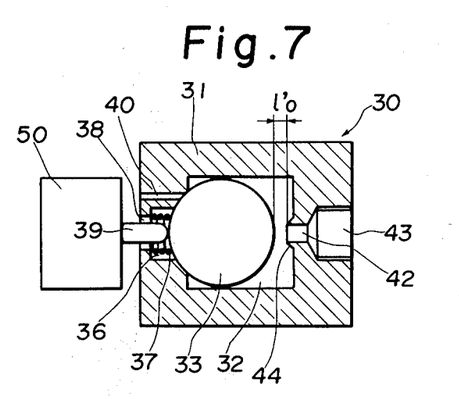
FIG. 7 is another sectional view of the pressure detecting device in FIG. 6, in which the pressure receiving member is located in the forward position.

Next, the second embodiment of the present invention will be described with reference to FIG. 6 and FIG. 7. FIGS. 6 and 7 illustrate another pneumatic-electric signal converter, in which the reference numeral 30 denotes a pressure detecting device and the reference numeral 50 does a limit switch. The housing 31 of the pressure detecting device 30 is constructed such that it is longitudinally split to two case halves which are in turn coupled each other with the aid of bolts (not shown) to form a square or cylindrical column body. In the housing 31 of the detecting device is formed an axial bore 32 having a circular section. In the axial bore 32 is axially displaceably disposed a ball 33 made of light weight and resilient material such as nylon, polyurethane the like, which serves as a pressure receiving member. On the left side of the detecting device housing 31 is formed a curved surface 35 which is located opposite to said ball 33 and has an outer diameter a little smaller than that of the ball 33. At the central portion of said curved surface 35 is formed a circular hole 36 in which a coil spring 37 is received. Further on the bottom of said circular hole 36 is formed a through hole 38 through which an actuator rod 39 is extended so as to shift the limit switch 50 by way of displacement thereof in the both directions. Moreover on the side wall portion 34 of the detector housing 31 is provided a discharge port 40 which is extended to said curved surface 35.

On the opposite side wall portion 41 of the detector housing 31 is provided a pressure detecting port 42 at the central part thereof, which is in communication with the axial bore 32 as well as with an inlet 43. Said inlet 43 of the pressure detecting port 42 is threaded over the inner wall thereof so as to make a connection to a pneumatic piping (not shown). The left end of the detecting port 42 is protruded into the axial bore 32 to form an annular valve seat 44 so that the ball 33 is brought in contact with said valve seat 44 by means of the coil spring 37, as illustrated in FIG. 6. In the positional state of the pressure detecting device in FIG. 6 air tightness is assured between the pressure detecting port 42 and the discharge port 40, wherein sealing area $S_3$ is equal to the area occupied by the valve seat 44. Hereinafter this area $S_3$ is referred to as a pressure detecting port side sealing area. On the contrary, when a portion of the ball 33 comes in close contact with the periphery part of the curved area 35, as shown in FIG. 7, sealing area $S_4$ which assures air-tightness between the pressure detecting port 42 and the discharge port 40 is equal to the area occupied by said periphery part of the curved surface 35. Hereinafter this area $S_4$ is referred to as discharge port side sealing area. As apparent from the drawings, the following relation is applicable.

$$S_4 > S_3$$

As long as input air pressure P is lower than the predetermined pressure $P_1$ with the pressure detecting device of the invention as constructed in the above mentioned manner, the sealing state as shown in FIG. 6 is maintained so that the ball 33 comes in air-tight contact with the valve seat 44. As the working pressure P exceeds said predetermined pressure $P_1$, the pressure receiving area of the ball 33 becomes rapidly increased, whereby the ball 33 is instantaneously displaced to the position as shown in FIG. 7, causing the ball 33 to be brought in air-tight contact with the peripheral edge of the curved surface 35. On the contrary, as the inlet air pressure P is lowered below the predetermined one $P_2$, the ball 33 is instantaneously displaced backward to the position as shown in FIG. 6. Thus the relation between the input air pressure P and displacement distance l is illustrated as a hysteresis loop in FIG. 5.

It will be readily recognized from the above description that the pressure detecting device in accordance with the second embodiment of the invention has the same technical advantages as those mentioned with the first embodiment of the invention particularly in respect of the hysteresis loop produced in that way as well as no sealing material is provided on the outer surface of the ball. Moreover since the ball in the second embodiment is by no means subjected to excessive force as is the case with the piston poppet 17 in accordance with the first embodiment, little trouble takes place with the pressure detecting device, resulting in easy manufacturing and lowered manufacturing cost. Furthermore, since the ball 33 carried out sealing operation with the aid of its own resilience, no specific seal is required and thus the pressure detecting device is simple in structure and easy to be manufactured.

Figure 8:
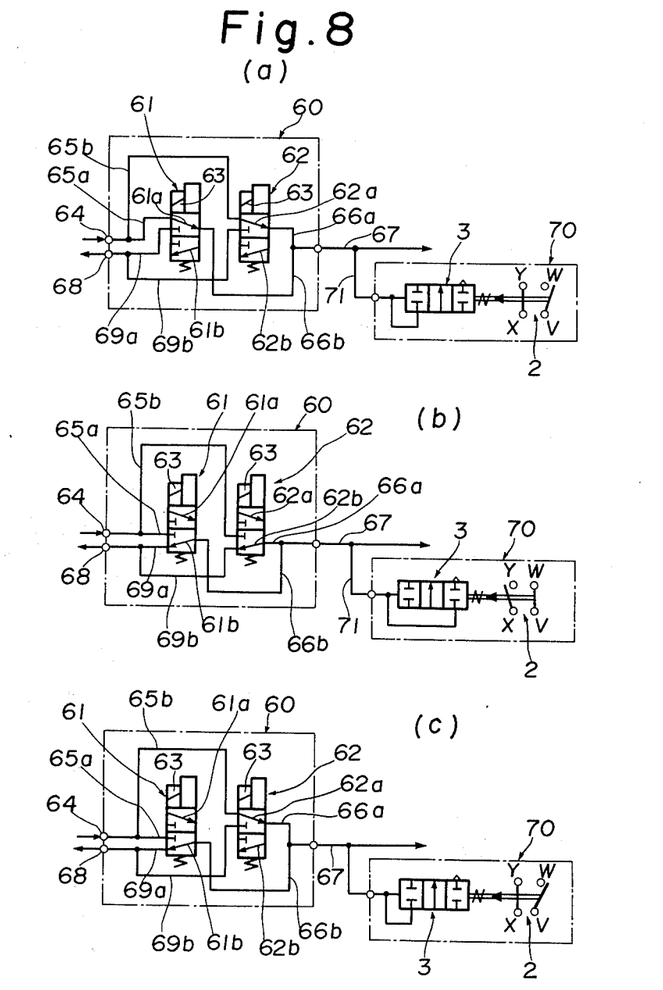
FIG. 8(a) is a piping diagram during normal operation of the press machine.
FIG. 8(b) is a piping diagram when the press machine comes to stop.
FIG. 8(c) is a piping diagram when any trouble takes place with valve elements in either one of the double valves.

Next, the first application of the pressure detecting device in accordance with the invention will be described with reference to FIG. 8.

In the drawing the reference numeral 60 denotes a parallel flow type double valve and this double valve 60 serves for controlling supply of pressurized air to a press machine is such that as pressurized air is supplied through the double valve to the press machine, a clutch (not shown) is brought in engagement, then the press machine performs press operation and then as the press machine is moved to the upper dead point, the double valve is shifted to stop supply of compressed air and thereby the clutch is disengaged, causing a brake to be effective, whereby the press machine comes to stop.

The double valve 60 comprises two valve elements 61 and 62 in order that the press machine comes to stop for safety without fail with the aid of either of said two valve elements, when one of the valve elements has gone wrong. Specifically, as illustrated in FIG. 8(a), the compressed air supply port 64 is communicated with the press machine via the inlet side divided flow passages 65a and 65b, the passages 61a, 62b in the valve elements 61 and 62, the outlet side divided flow passages 66a and 66b and passage 67, while the solenoids 63 are turned on. Thus, as long as the inlet port 64 is in communication with the press machine, pressurized air is supplied to the press machine so that the same is operated. Further, as illustrated in FIG. 8(b), the air exhaust port 68 is communicated with the press machine through the outlet side divided flow passages 69a and 69b, the passages 61a and 62b in the valve elements 61 and 62, the secondary side divided flow passages 66a and 66b and the passage 67, while the solenoids 63 and 64 are turned off. Thus as long as the exhaust port 68 is in communication with the press machine, pressurized air flow back from the press machine to be exhausted through the exhaust port 68, whereby the press machine comes to stop at the upper dead point. Even though one of the valve elements, for instance, valve element 62 is out of normal operation, the press machine stops without fail, as long as the other one 61 is normally operated. Specifically, when the valve element 62 comes out of normal operation, pressurized air is supplied to the press machine via the inlet side flow passage 65b, the passage 62a in the valve element 62, the secondary side flow passage 66a and the piping 67, as illustrated in FIG. 8(c). But since the other valve element 61 functions normally, pressurized air supplied to the press machine flows back via the piping 67, the secondary side flow passage 66b, the passage 61b in the valve element 61 and the outlet side flow passage 69a and then is exhausted through the exhaust port 68, whereby the press machine comes to stop. To search for any trouble with the double valve 60, a pneumatic-electric signal converter 70 is mounted, which is provided with a pressure detecting device in accordance with the invention. For simplification of description it is assumed that the pneumatic-electric signal converter 70 is similar to that of the first embodiment of the invention as shown in FIGS. 3 and 4. Now description will be made with reference to FIGS. 3, 4 and 8(a) to (c).

The pressure detecting port 10 of the pressure detecting device 1 is connected to the piping 67 via the pneumatic piping 71. When pressurized air (5 Kg/cm²) is supplied to the press machine, as shown in FIG. 8(a), same high pressure air reaches the pressure detecting port 10 via the pneumatic piping 71. Pressure acting on the piston poppet 17 exceeds the predetermined pressure $P_1$ (in this case $P_1 = 2$ Kg/cm²). Thus the piston poppet 17 is instantaneously displaced from the positional state in FIG. 3 to that in FIG. 4, causing the actuating rod 19 to be displaced forward, whereby the contacts V and W in the limit switch 2 are turned off, while the contacts X and Y are turned on. As the contacts X and Y are turned on, for instance, an indicator lamp is lit, which is connected to said contacts X and Y, and thereby operation of the press machine can be indicated.

Next, when the press ram is moved up the upper dead point and then the both solenoids 63 are normally operated to the OFF-position, pressurized air in the press machine is exhausted via the passages 61a and 61b and the exhaust port 68, as shown in FIG. 8(b), whereby inlet air pressure to be supplied to the pressure detecting port 10 is lowered below $P_2$ (in this case $P_2 = 0.03$ Kg/cm²). Thus the piston poppet 17 is instantaneously displaced from the positional state in FIG. 4 to that in FIG. 3, causing the actuating rod 19 to be retracted, whereby the contacts V and W are turned on, while the contacts are turned off. Thereby, for instance, a lamp connected to said contacts V and W is lit, which indicates that pressurized air is exhausted from the press machine and the press machine comes to stop and that the two valve elements 61 and 62 incorporated in the double valve 61 are normally operated. If one of the valve elements in the double valve 60, for instance, the valve element 62 is out of normal operation, pressurized air is delivered to the press machine through said valve element 62, but at the same time pressurized air supplied to the press machine is exhausted to the outside through the other valve element 61 as shown in FIG. 8(c). This causes pressure of pressurized air from the press machine to be reduced to such an extent lower enough as to allow the press machine to come to stop, but there is still left effective residual pressure equivalent to 0.05% of supply pressure 5 Kg/cm$^2$, that is, 0.25 Kg/cm$^2$. Since the residual pressure is exerted on the whole area of the piston poppet 17 in the pressure detecting device 1 and this residual pressure 0.25 Kg/cm$^2$ is higher than the predetermined pressure $P_2 = 0.03$ Kg/cm$^2$, the piston poppet 17 is held in the positional state as shown in FIG. 4, whereby the actuating rod 19 is not displaced backward. Thus the switch 2 is maintained still in the same state as during operation of the press machine, in which the contacts V and W are in the OFF-position, while the contacts X and Y are in the ON-position. This informs of the fact that one of the valve elements in the double valve 60 is out of normal operation. It is generally recognized with this kind of device that there is existent very high difference between supply pressure and discharge pressure to be detected. It is possible to detect both of high pressure and low pressure by means of the pressure detecting device in accordance with the invention. Further it is possible to detect with the aid of the pressure detecting device of the invention very fine pressure difference between the residual pressure at the time of normal operation of the both valve elements 61 and 62 and that in the event that either of the valve elements 61 and 62 fails to be normally operated, because the pressure detector of the invention has excellent response accuracy even in the area of lower pressure.

Figure 9:
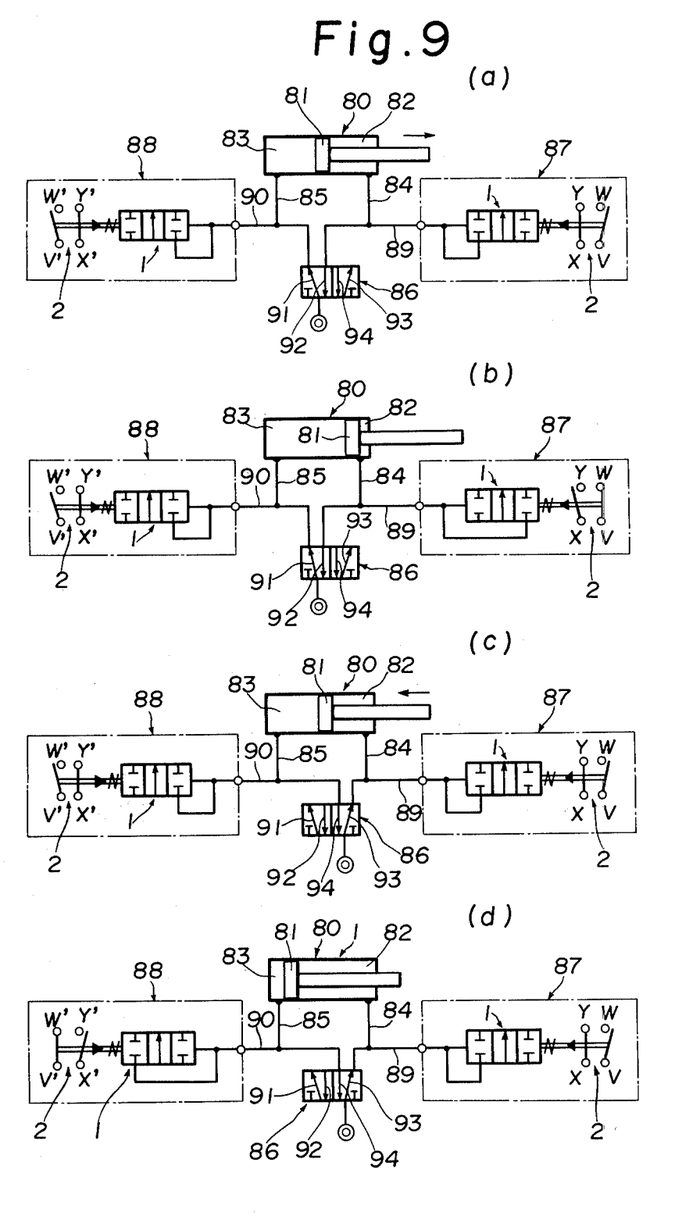
FIG. 9(a) is a piping diagram in the course of forward displacement.
FIG. 9(b) is a piping diagram after completion of the forward displacement.
FIG. 9(c) is a piping diagram in the course of rearward displacement and FIG. 9(d) is a piping diagram after completion of the rearward displacement.

Next, the second application of the pressure detecting device in accordance with the present invention, in which the same is employed for detecting stroke ends of a pneumatic cylinder will be described with reference to FIGS. 9 and 10. In FIG. 9 the reference numeral 80 denotes a pneumatic cylinder which is divided into two chambers 82 and 83 by means of a piston 81, said chambers 82 and 83 being in communication with pipings 84 and 85 respectively. Further the pipings 84 and 85 are connected to supply source of pressurized air via a control valve 86. Furthermore the pipings 84 and 85 are connected to pneumatic-electric signal converters 87 and 88 respectively. Said pneumatic-electric signal converters 87 and 88 are constructed in the same manner as those in accordance with the first embodiment of the invention as shown in FIGS. 3 and 4. The pressure detecting ports 10 of the pressure detecting device 1 are communicated with the pipings 84 and 85 via pneumatic pipes 89 and 90.

Next, operation of the arrangement as constructed in the above manner for detecting the stroke ends of the pneumatic cylinder will be described as follows.

First, when the pneumatic cylinder 80 is operated in the forward direction as shown in FIG. 9(a), pressurized air flows into the chamber 83 via the passage 91 in the control valve 86 and the piping 85 so that the piston 81 is displaced in the forward direction. At the same time pressurized air in the chamber 82 is discharged via the piping 84 and the passage 92 in the control valve 86. Since the inlet air pressure P at the pressure detecting port 10 of the pressure detecting device 1 in the second pneumatic-electric signal converter 88 exceeds the predetermined pressure $P_1$, as illustrated by a curved line A in FIG. 10, the piston poppet 17 is instantaneously displaced from the positional state in FIG. 3 to that in FIG. 4, causing the actuating rod 19 to be moved forward, whereby the contacts V' and W' are turned off, while the contacts X' and Y' are turned on. Further, since the inlet air pressure at the pressure detecting port 10 of the pressure detecting device 1 in the first pneumatic-electric signal converter 87 is higher than the predetermined pressure $P_2$, as illustrated by another curved line B in FIG. 10, the actuating rod 19 is held still in the forward position, as shown in FIG. 4, whereby the contacts V and W are in the OFF position, while the contacts X and Y are in the ON position.

Figure 10:
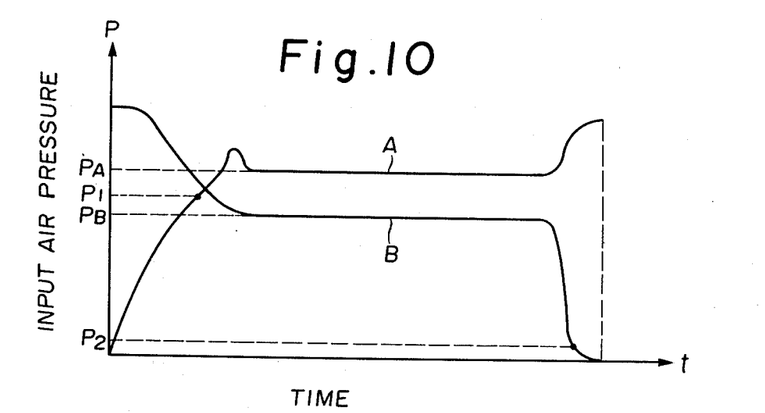
FIG. 10 is an operating characteristics diagram during operation of the pneumatic cylinder.

Next, when forward movement of the piston 81 is completed, as illustrated in FIG. 9(b), the inlet air pressure P to the pressure detecting device 1 of the second pneumatic-electric signal converter 88 is raised above the predetermined pressure $P_1$, as illustrated by the right part of the curved line A in FIG. 10. Thus the forward position of the actuating rod 19 is still maintained as shown in FIG. 4, so that the contacts V' and W' are in the OFF position, while the contacts X' and Y' are in the ON position. On the other hand, the inlet air pressure P at the pressure detecting port 10 in the pressure detecting device 1 of the first pneumatic-electric signal converter 87 is rapidly lowered below the predetermined pressure $P_2$, as illustrated by the right part of the curved line B in FIG. 10. This causes the piston poppet 17 to be instantaneously displaced from the position in FIG. 4 to that in FIG. 3, whereby the actuating rod 19 is displaced rearward. Thus the contacts V and W are turned on and the contacts S and Y are turned off, so that the forward end of the pneumatic cylinder can be detected.

Next, rearward operation of the pneumatic cylinder 80 will be described as follows.

First the control valve 86 is shifted and pressurized air is delivered into the chamber 82 via the passage 93 in the valve 86 and the piping 84, while pressurized air in the chamber 83 is discharged via the piping 85 and the passage 94 in the valve 86. Thus the piston 81 starts rearward movement, as illustrated in FIG. 9(c). At this moment inlet air pressure P at the pressure detecting port 10 in the pressure detecting device 1 of the first pneumatic-electric signal converter 87 is increased in excess of the predetermined pressure $P_1$, as illustrated by the curved line A in FIG. 10, causing the piston poppet 17 to be instantaneously displaced from the position in FIG. 3 to that in FIG. 4, whereby the actuating rod 19 is displaced in the forward direction so that the contacts V and W are turned off, while the contacts X and Y are turned on. On the other hand, inlet air pressure P to the pressure detecting device 1 of the second pneumatic-electric signal converter 88 is higher than the predetermined pressure $P_2$, as illustrated by the curved line B in FIG. 10, whereby the forward position of the actuating rod 19 shown in FIG. 4 is maintained. Thus the contacts V' and W' are still in the OFF position, while the contacts X' and Y' are still in the ON position.

Next, when rearward movement of the piston 81 is completed, inlet air pressure P at the pressure detecting port 10 of the second pneumatic-electric signal converter 88 is rapidly lowered below the predetermined pressure $P_2$, as illustrated by the right part of the curved line B in FIG. 10, whereby the piston poppet 17 is instantaneously displaced from the position in FIG. 4 to that in FIG. 3. Thus the actuating rod 19 is displaced in the rearward direction, the contacts V' and W' are turned on and the contacts X' and Y' are turned off. In the meantime, inlet air pressure at the pressure detecting port 10 in the pressure detecting device 1 of the first pneumatic-electric signal converter 87 is raised further above the predetermined pressure $P_1$, whereby the actuating rod 19 is maintained in the forward position so that the contacts V and W are still in the OFF position, while the contacts X and Y are still in the ON position. In this way the forward end of the pneumatic cylinder 80 is detected by the fact that the contacts V and W of the first pneumatic-electric signal converter 87 are shifted to the ON position and the contacts X and Y of the same are shifted to the OFF position, while the rearward end is detected by the fact that the contacts V' and W' of the second pneumatic-electric signal converter 88 are shifted to the ON position and the contacts X' and Y' are shifted to the OFF position. In this connection it should be noted that the stroke ends of the cylinder can be detected at the high pressure area as well as at the low pressure area with the aid of the pressure detecting device of the invention. Particularly when pressure $P_B$ on the exhaust side is lower than supply pressure $P_A$, usually the predetermined pressure $P_2$ should be lowered on detecting at the low pressure area (detecting of stroke end). By using the pressure detecting device of the invention this can be achieved.

As mentioned above, the present invention consists in that air sealing is established between the both side walls of the detector housing and the pressure receiving member and that sealing area on the discharge port side between the side wall of the detector housing and the pressure receiving member is substantially larger than that on the pressure detecting port side between the side wall of the detector housing and the pressure receiving member. Hence the relation between inlet air pressure and displacement distance of the pressure receiving member can be represented by a hysteresis loop. Further pressure detecting can be effected in the optimum manner in the direction of said hysteresis loop. Furthermore, since the pressure ratio can be determined substantially by way of said two sealing areas, it is possible to prepare a larger pressure ratio.

As another advantage of the invention an excellent response accuracy can be obtained, since the pressure detecting device is constructed such that a preliminary operative condition is prepared until the predetermined pressure is reached and once the same is reached, the pressure receiving member is instantaneously displaced to shift the switch.

As further another advantage of the invention, pressure detecting is carried out in a wide pressure range covering high pressure to low pressure area at a high response accuracy with long durability of service life, since the pressure detecting device is constructed such that no sealing means is mounted on the outer periphery of the piston poppet, which is adapted to come in sliding contact with the inner wall of the detector housing, as is the case with the conventional pressure detecting device.

As mentioned above, the present invention has been described with reference to the preferred embodiments and advantageous applications thereof, but it should be of course understood that the invention may be changed or modified without any departure from the spirit and scope of the invention.

What is claimed is:

1. A pressure detecting device comprising a housing with a pair of side walls and having a pressure detecting port at one of the side walls and a discharge port at the other side thereof, a pressure receiving member axially displaceable disposed in an axial bore in said housing, said axial bore being communicated with the pressure detecting port through said one side wall of the housing, an actuating rod secured to said pressure receiving member and displaceably extended through the other side wall of the housing and a coil spring which is energized to displace the pressure receiving member toward the pressure detecting port, wherein seal is provided between the side wall of the housing at the pressure detecting port side and the pressure receiving member as well as between the other side wall of the housing at the discharge port side and the pressure receiving member and further sealing area at the discharge port side is larger than that at the pressure detecting port side.

2. A pressure detecting device as set forth in claim 1, wherein the pressure receiving member is constructed in the form of disk-like piston poppet and one of the ends of the actuating rod is secured to said piston poppet at the central part thereof.

3. A pressure detecting device as set forth in claim 1, wherein either on the side wall of the detector housing or on the end face of the piston poppet opposite to said side wall of the housing is arranged the first annular seal, while on the side wall of the detector housing on the discharge port side or on the inner peripheral wall of the detector housing or on the end face of the piston poppet facing said side wall is arranged the second annular seal which has a diameter larger than that of the first annular seal.

4. A pressure detecting device as set forth in claim 1, wherein the pressure receiving member is a ball.

5. A pressure detecting device as set forth in claim 4, wherein said ball is formed of light weight and resilient material such as MC nylon, polyurethane or the like and on the side wall at the pressure detecting port side of the detector housing is formed a valve seat which is axially protruded inward in such a manner as to surround the periphery of the pressure detecting port, while on the other side wall at the discharge port side of the housing is formed a curved surface surrounding the discharge port.

6. A pressure detecting device as set forth in claim 1, wherein the detector housing includes a case in which a bore is axially formed and opened at one side wall thereof and an end cap which is securely inserted in said bore so as to close the open end thereof.

7. A pressure detecting device as set forth in claim 1, wherein the detector housing includes two case halves which are axially split, said case halves being united each other by means of tightening means such as bolts or the like.

8. A pressure detecting device as set forth in claim 1, wherein a limit switch is arranged in axial alignment with the actuating means, which is adapted to be turned on or off by said actuating means.

9. A pressure detecting device as set forth in claim 1, wherein a mechanical valve is arranged in axial alignment with the actuating means, which is adapted to be shifted to ON position or OFF position by said actuating means.

10. A control system for a press machine in which operation and stop thereof are controlled by way of controlling supply and exhaust of pressurized air to and from the press machine with the aid of a double valve and the pressure detecting device as set forth in claim 1, wherein said double valve is constructed of two valve elements, the air inlet port is divided at said two valve elements to be communicated with piping at the press machine side through the respective valve elements, while the air exhausting port is divided and communicated with the piping leading to the press machine through the respective valve elements, said piping leading to the press machine through the respective valve elements, said piping leading to the press machine is selectively communicated with the air inlet or exhausting port by way of shifting said both valve elements at the same time, and further said piping leading to the press machine is connected to the pressure detecting port of the pressure detecting device.

11. A stroke end detecting system for a pneumatic cylinder in which the pressure detecting devices as set forth in claim 1 are incorporated, wherein both pressure chambers in the pneumatic cylinder divided by the piston are communicated to the pressure detecting ports of the pressure detecting devices.

* * * * *